United States Patent [19]

Slough

[11] 4,107,603

[45] Aug. 15, 1978

[54] ELECTROMAGNETIC MEANS AND METHOD FOR DETECTING PROPELLER SHAFT BEARING WEAR

[75] Inventor: Carlton M. Slough, Spring, Tex.

[73] Assignee: Texaco Inc., New York, N.Y.

[21] Appl. No.: 745,263

[22] Filed: Nov. 26, 1976

[51] Int. Cl.² .............................................. G01R 33/12
[52] U.S. Cl. ................................ 324/207; 33/174 L; 340/517; 340/682
[58] Field of Search ............... 324/34 R, 34 D, 34 E, 324/34 PS, 61 R, 207, 208; 33/174 L; 340/269, 271, 261; 73/71.4

[56] References Cited

U.S. PATENT DOCUMENTS

| | | | |
|---|---|---|---|
| 2,078,796 | 4/1937 | Greentree et al. | 324/34 D |
| 3,677,072 | 7/1972 | Weichbrodt et al. | 340/261 |
| 3,913,084 | 10/1975 | Bollinger et al. | 73/71.4 |

FOREIGN PATENT DOCUMENTS

| | | | |
|---|---|---|---|
| 516,658 | 9/1955 | Canada | 324/34 R |
| 836,116 | 6/1966 | United Kingdom | 324/34 D |

*Primary Examiner*—Robert J. Corcoran
*Attorney, Agent, or Firm*—Thomas H. Whaley; Carl G. Ries; Ronald G. Gillespie

[57] ABSTRACT

Apparatus monitors the wear of a propeller shaft bearing such as may be found in a tanker, or any other ship, while it is in service. As the shaft is rotating a sensor provides a signal corresponding to the displacement of the shaft with respect to its longitudinal axis. The displacement signal is applied to an averaging network which provides a signal corresponding to the average displacement to a recorder. The recording of the average displacement signal permits determination of wear of the shaft bearing.

6 Claims, 1 Drawing Figure

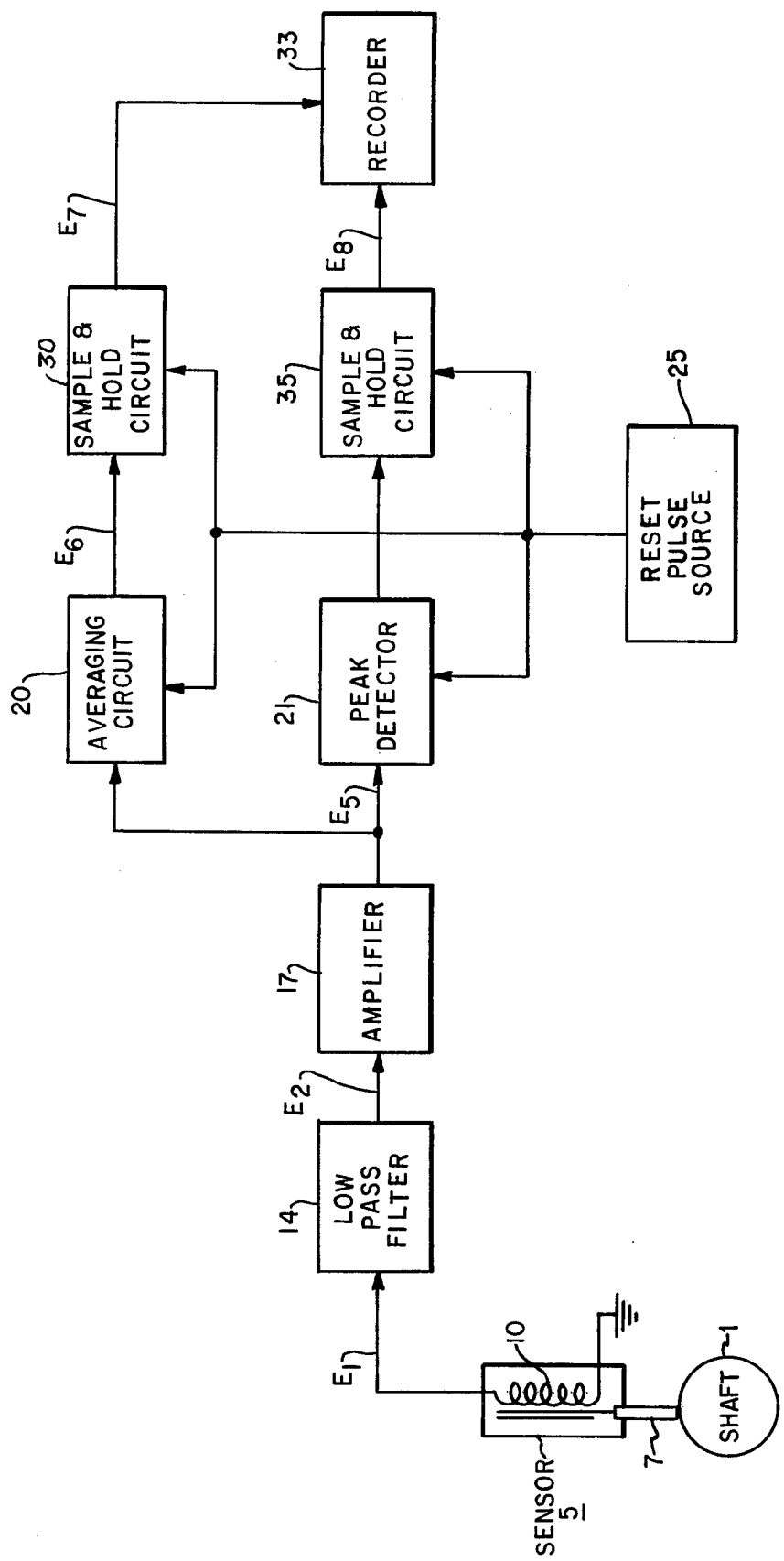

ELECTROMAGNETIC MEANS AND METHOD FOR DETECTING PROPELLER SHAFT BEARING WEAR

BACKGROUND OF THE INVENTION

FIELD OF THE INVENTION

The present invention and method relate to measuring apparatus and methods in general and, more particularly, to methods and apparatus for measuring shaft bearing wear.

SUMMARY OF THE INVENTION

The wear on a shaft bearing while the shaft is rotating is determined by sensing the displacement of the shaft relative to its longitudinal axis and providing a corresponding displacement signal. The displacement signal is averaged by an averaging circuit to provide an average displacement signal. A recorder records the average displacement signal to provide a record corresponding to the wear of the shaft bearing.

The objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustrative purposes only and is not to be construed as defining the limits of the invention.

DESCRIPTION OF THE DRAWING

The drawing is a simplified block diagram of apparatus, constructed in accordance with the present invention, for sensing and recording the wear of a shaft bearing for a recording propeller shaft in a ship.

DESCRIPTION OF THE INVENTION

Propeller shaft bearings such as found in ships are very essential to the operation of the ships and failure of the shaft bearing while at sea is not only expensive but can be considered hazardous. Further, an unwarranted shaft bearing replacement due to scheduled maintenance at a port is wasteful and expensive. The present invention provides for monitoring the wear of a shaft bearing while the shaft is in operation so that unscheduled maintenance may be prevented or minimized and unwarranted scheduled maintenance may be avoided.

Referring to the Figure, shaft 1, shown with its longitudinal axis into the drawing, is rotating during normal operation, A shaft bearing (not shown) is in close proximity to a sensor 5. The distance between the shaft bearing and sensor 5 is not critical.

Sensor 5 is an electromagnetic sensor and includes a magnetic member 7 magnetically coupled to a coil 10 having one end connected to ground. Member 7 is spatially arranged with shaft 1, so that there is a gap between shaft 1 and member 7. As the shaft bearing (not shown) wears, shaft 1 will experience displacement along axii transverse to the longitudinal axis of shaft 1. As shown in the Figure, sensor 5 is mounted above shaft 1 along a vertical traverse axis although such a position is not essential. The displacement of shaft 1 cuts the lines of force emanating from member 7 thereby changing the current induced in coil 10. Coil 10 provides a signal $E_1$ whose magnitude is a function of bearing wear and whose frequency is a function of shaft 1 rotational speed. Thus by monitoring the magnitude of signal $E_1$ over a period of time, bearing wear can be determined.

Signal $E_1$ is provided to a low pass filter 14 where it is filtered and applied to an amplifier 17 as signal $E_2$. Amplifier 17 provides a displacement signal $E_5$ to an averaging circuit 20 and to a peak detector 21. Averaging circuit 20 and peak detector 21 are periodically reset by the trailing edges of reset pulses provided by a reset pulse source 25. Averaging circuit 20 in response to the displacement signal $E_5$ and the reset pulses provides a signal $E_6$ to a sample and hold circuit 30 which samples signal $E_6$ in response to the leading edges of the reset pulses. Sample and hold circuit 30 provides an average displacement signal $E_7$ to a recorder 33 which records the average displacement signal $E_7$.

Peak detector 21 provides a signal corresponding to the peaks in signal $E_5$ to another sample and hold circuit 35. Sample and hold circuit 35, in response to the leading edges of the reset pulses, samples the signal from peak detector 21 to provide a peak signal $E_8$ to recorder 33 for recording. This signal represents maximum shaft displacement during sampling period.

The present invention as hereinbefore described is apparatus for determining the average shaft displacement and maximum wear of shaft bearing while the shaft is rotating in service. The rotation of the shaft induces an electrical signal corresponding to the shaft's surface displacement along the shaft's longitudinal axis. The signal is then filtered and amplified to provide a displacement signal which is averaged and peak detected to provide signals corresponding to average displacement corresponding to average bearing wear and maximum displacement corresponding to maximum bearing wear. The two signals are then recorded to provide a visual record of the wearing of the shaft bearing.

What is claimed is:

1. Apparatus for the monitoring of the wear of a shaft bearing while the shaft is rotating, comprising a magnetic noncontacting means for sensing displacement of the rotating shaft with respect to the shaft's longitudinal axis and providing a corresponding displacement signal reset pulse means for providing reset pulses; means connected to the sensing means and to the reset pulse means for averaging the displacement signal to provide an average displacement signal, said averaging means includes an averaging circuit means connected to the sensing means and to the reset pulse means for averaging the displacement signal in accordance with the reset pulses, and sample and hold means connected to the averaging circuit means and to the reset pulse means for sampling and holding the signal from the averaging circuit means in response to the reset pulses to provide the average displacement signal; and means for recording the average displacement signal to provide a record so that changes in the shaft displacement can be determined so as to monitor wear of the shaft bearing.

2. Apparatus as described in claim 1 further comprising means connected to the sensing means for detecting peaks in the displacement signal and providing a signal corresponding to the detected peaks to the recording means so as to provide a visual record of maximum shaft displacement.

3. Apparatus as described in claim 2 in which the sensing means includes a magnetic sensor having a magnetized member and a coil and by which a voltage is induced in the coil due to the spatial relationship of the magnetized member to the rotating shaft, a low pass filter connected to the coil filters the induced voltage, and an amplifier amplifies the filtered voltage to provide the displacement signal.

4. Apparatus as described in claim 3 in which the means for detecting peaks includes a peak detector connected to the amplifier and to the reset pulse means which detects the peaks of the displacement signal in response to the reset pulses and provides a corresponding signal, second sample and hold means connected to the peak detecting means and to the reset pulses source for sampling and holding the peak signal from the peak detecting means in accordance with the reset pulses to provide the peak signal to the recorder.

5. A method for monitoring the wear of a shaft bearing while the shaft is rotating, which comprises creating a magnetic field close to the rotating shaft so that displacement of the shaft during rotation transverse to the shaft's longitudinal axis affects the magnetic field, deriving a displacement signal from the magnetic field whose magnitude corresponds to the wear of the shaft's bearing, averaging the displacement signal, periodically resetting the averaged signal and sampling and holding the averaged displacement signal so as to provide an average displacement signal, and recording the average displacement signal so that changes in the shaft displacement can be determined so as to monitor the wear of the shaft bearing.

6. A method as described in claim 5 which further comprises detecting the peak of the displacement signal, providing a maximum displacement signal corresponding to maximum shaft displacement in accordance with the detected peaks, and recording the maximum displacement signal.

* * * * *